United States Patent
Weiss et al.

(10) Patent No.: US 7,029,722 B2
(45) Date of Patent: Apr. 18, 2006

(54) CONDUCTIVE ELASTOMERIC FOAMS AND METHOD OF MANUFACTURE THEREOF

(75) Inventors: Robert A. Weiss, Mansfield Center, CT (US); Can Erkey, South Windsor, CT (US); Suresh L. Shenoy, Richmond, VA (US); Daniel Cohen, Haifa (IL)

(73) Assignee: The University of Connecticut, Storrs, CT (US)

( * ) Notice: Subject to any disclaimer, the term of this patent is extended or adjusted under 35 U.S.C. 154(b) by 401 days.

(21) Appl. No.: 10/054,021

(22) Filed: Nov. 13, 2001

(65) Prior Publication Data

US 2002/0193450 A1 Dec. 19, 2002

Related U.S. Application Data

(60) Provisional application No. 60/247,077, filed on Nov. 20, 2000.

(51) Int. Cl.
*B05D 5/00* (2006.01)
*B05D 3/10* (2006.01)
*B05D 3/00* (2006.01)
*C23C 16/00* (2006.01)

(52) U.S. Cl. ............... 427/244; 427/255.28; 427/255.6; 427/301; 427/322

(58) Field of Classification Search ................ 427/244, 427/255.23, 255.28, 255.6, 301, 302, 322
See application file for complete search history.

(56) References Cited

U.S. PATENT DOCUMENTS 4,394,304 A * 7/1983 Wnek .................... 252/519.21
5,421,959 A * 6/1995 Oka et al. .................. 162/138

(Continued)

FOREIGN PATENT DOCUMENTS

FR 2776211 9/2001
JP 63128034 5/2001

(Continued)

OTHER PUBLICATIONS

Fu, Y; Palo, D R; Erkey, C; Weiss, R A; "Synthesis of Conductive Polypyrrole/Polyurethane Foams via a Supercritical Fluid Process", *Macromolecules*, vol. 30, 1997 pp. 7611–7613.

Fu, Y; Weiss, R.A.; "Conductive Elastomeric Foams prepared by In Situ Vapor Phase Polymerization of Pyrrole and Copolymerization of Pyrrole and N–Methylpyrrole", *Polymer Engineering And Science*, vol. 38, No. 5, 1998.

Aydinli, B.; Toppare, L.; Tincer, T.; "A Conducting Composite of Polypyrrole with Ultrahigh Molecular Weight Polyethylene Foam", Journal of Applied Polymer Science, 1999, vol. 72, pp. 1843–1850.

Neoh, K. G.; Kang, E. T.; T.C.; "Halogen–Induced Chemical Copollymerization of Pyrrole With N–Methylpyrrole", Journal of Applied Poilymer Science, John Wiley and Sons Inc. New York, vol. 38, No. 11, Dec. 5, 1989 pp. 2009–2017.

Ojio, T; Miyata, S.; "Highly Treansparent and Conducting Polypyrrole–Poly(vinyl alcohol) Composite Films Prepared by Gas State Polymerizatikon"; Polymer Journal, vol. 18, No. 1, 1986, pp. 95–98.

(Continued)

Primary Examiner—Timothy Meeks
Assistant Examiner—Eric B Fuller
(74) Attorney, Agent, or Firm—Cantor Colburn LLP

(57) ABSTRACT

A conductive polymer composite, comprising a polymer and polypyrrole and derivatives thereof. The composite is manufactured by first diffusing an oxidant such as iodine into the polymer, and then diffusing pyrrole or a pyrrole derivative vapor into the impregnated polymer, resulting in an in situ chemical oxidative polymerization of pyrrole at the oxidant site. The conductivity of the composite foam can be effectively controlled between $10^{-7}$ to $10^{-1}$ S/cm, inclusive.

6 Claims, 2 Drawing Sheets

APPARATUS FOR IMPREGNATION EXPERIMENTS

1. Carbon Dioxide Cylinder
2. Refrigeration Unit
3. Liquid Pump
4. Syringe Pump
5. Oven
6. Magnetic Stirrer
7. SFE Vessel
8. Pressure Transducer

U.S. PATENT DOCUMENTS

RE35,278 E * 6/1996 Newman et al. ............... 442/29
6,156,235 A * 12/2000 Bessette et al. ............. 252/511
6,551,661 B1 * 4/2003 Bugnet et al. ............... 427/301

FOREIGN PATENT DOCUMENTS

JP 09143273 6/2001
JP 3239720 10/2001

OTHER PUBLICATIONS

Bi, K.; et al. "An Electrically–Conductive Composite Prepared By Electrochemical Polymerization of Pyrrole Into Polyurethane", Synthetic Metals, Elsevier Sequoia, Lausanne, CH, No. 22, 1987, pp. 145–156.
International Search Report, date of mailing: Jun. 17, 2002.

* cited by examiner

APPARATUS FOR IMPREGNATION EXPERIMENTS

1. Carbon Dioxide Cylinder
2. Refrigeration Unit
3. Liquid Pump
4. Syringe Pump
5. Oven
6. Magnetic Stirrer
7. SFE Vessel
8. Pressure Transducer

CONDUCTIVE ELASTOMERIC FOAMS AND METHOD OF MANUFACTURE THEREOF

CROSS REFERENCE TO RELATED APPLICATION

This application claims priority to U.S. Ser. No. 60/247,077, filed Nov. 20, 2000 which is incorporated by reference herein in its entirety.

BACKGROUND OF THE INVENTION

The present invention relates to polymeric composites, and in particular to methods for the preparation of conductive polymeric composite foams.

Certain conjugated polymers, for example, polypyrrole, polyaniline and polythiophene, are inherently electrically conductive in their oxidized state. However, those polymers are also insoluble, infusible and relatively brittle, so that their applications have been limited. One approach for imparting the desired mechanical properties to these conductive polymers while retaining their excellent electrical properties is to polymerize the conductive polymer within another polymer host. That may be accomplished by an in situ oxidative polymerization of a monomer such as pyrrole in the presence of the polymer host. This approach has been used with good success to prepare conductive composite materials with conductivities from $10^{-7}$ to $10^2$ S/cm and in various forms (e.g., films, fibers and foams). See, for example, M. C. DeJesus, Y. Fu and R. A. Weiss, "Conductive Polymer Blends Prepared by In Situ Polymerization of Pyrrole: A Review", *Polym. Eng. Sci.* Volume 37, pp. 1936–1943 (1997). One drawback of preparing conductive composites by the in situ polymerization of pyrrole, however, is volatile organic compounds (VOCs) are used as solvents for incorporating the oxidant and/or the pyrrole. The use of the VOCs presents economic and environmental limitations on the process.

A solventless process for preparing conductive polyurethane foams in which supercritical carbon dioxide ($scCO_2$) was used to dissolve an oxidant and swell the polyurethane foam in order to incorporate the oxidant has been reported by Y. Fu, D. R. Palo, C. Erkey and R. A. Weiss in "Synthesis of Conductive Polypyrrole/polyurethane Foams Via a Supercritical Fluid Process", *Macromolecules*, Volume 30, pp. 7611–7613 (1997); and by Y. Fu, D. R. Palo, C. Erkey and R. A. Weiss in "Synthesis of Conductive Polypyrrole/polyurethane Foams Via a Supercritical Fluid Process", ACS Polymer Preprints, Volume 38, p. 430 (1997). That process requires the synthesis of organo-metal sulfonate and organo-metal carboxylate compounds that exhibit higher solubility in $scCO_2$ than prior oxidants commonly used for the in situ polymerization of pyrrole, e.g., ferric chloride. The development of oxidants compatible with $scCO_2$ for the chemical oxidative polymerization of pyrrole were reported at the national meeting of the American Institute of Chemical Engineers in 1998 (I. Kaya, C. Erkey and R. A. Weiss, "Synthesis of Conductive Polymer Composites with Ferric Salts of Fluoroalkylsulfonic Acids as Oxidants Using Supercritical Fluids", AIChE National Mtg., Orlando, Fla. 1998) and described in the Master of Science Thesis of Ipek Kaya (Synthesis of Conductive Polymer Blends Using Supercritical Carbon Dioxide, University of Connecticut, 1999). Although the $scCO_2$ process eliminates or reduces the need for organic solvents, it is difficult to obtain products with uniform conductivity, and efficient removal of the redox byproduct of the oxidative polymerization reaction often requires use of organic solvents.

Accordingly, there remains a need in the art for methods for the effective in situ polymerization of pyrroles and other monomers within polymers to produce conductive polymer composites, wherein the methods do not require use of VOCs, and particularly wherein the composites have uniform conductivity throughout the polymer.

SUMMARY OF THE INVENTION

Host polymers having electrically conductive organic polymers uniformly distributed therein are provided by a process comprising impregnating the polymer with an oxidative catalyst in the vapor phase, followed by exposing the impregnated polymer to pyrrole monomer. Polymerization occurs upon contact of the pyrrole monomer with the iodine, and results in even distribution of the electrically conductive polypyrrole within the polymer. Such composites have conductivities of about $1 \times 10^{-7}$ to about $1 \times 10^{-1}$ S/cm, inclusive, wherein the conductivity values are even across the composite.

The above discussed and other features and advantages will be appreciated and understood by those skilled in the art from the following detailed description and drawings. All references cited herein are fully incorporated by reference.

BRIEF DESCRIPTION OF THE DRAWINGS

Referring now to the drawings wherein like elements are numbered alike in the several FIGURES.

DETAILED DESCRIPTION

Figure 1:
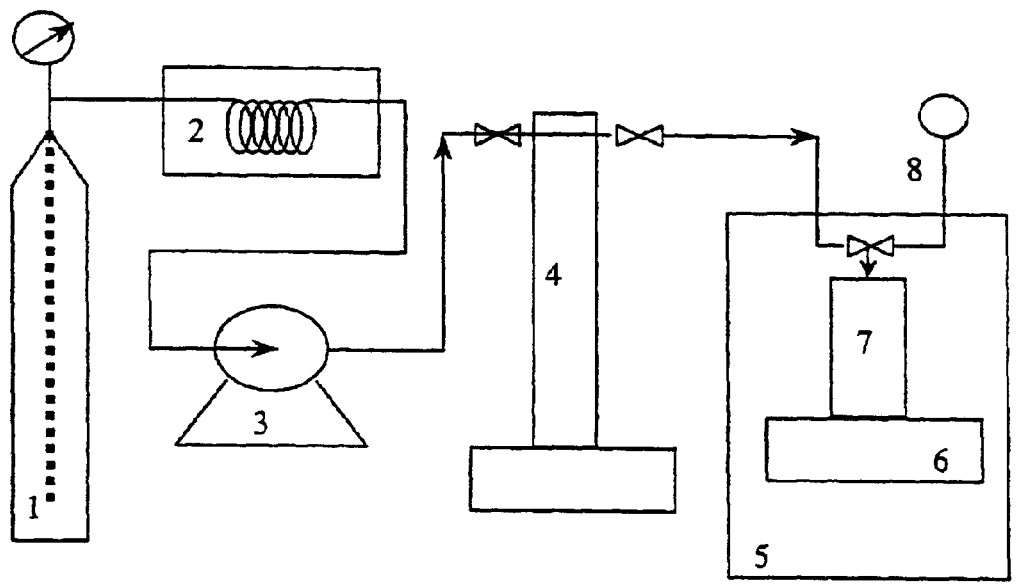
FIG. 1 is a schematic representation of an apparatus suitable for the practice of the method described herein.

A conductive polymer composite is produced by the solventless impregnation of a host polymer with an oxidative catalyst in the vapor phase, for example iodine, followed by exposure of the impregnated polymer to pyrrole monomers to form a conductive composite. The conductivities of the composites thus obtained are uniform throughout the polymer, and adjustable within the range of about $10^{-7}$ to about $10^{-1}$ S/cm, inclusive. Importantly, VOCs are not needed to conduct the polymerization or remove redox by-products from the composites.

A variety of host polymers may be used to form the conductive composites, including thermosets, elastomers, and thermoplastics, in the form of solids or foams. Microphase separated forms of the foregoing materials may also be used, such as block copolymers or ionomers. Exemplary solid polymers include but are not limited to silicones, polybutadiene, styrene-butadiene copolymers, urethanes, epoxies, polyesters, acrylics, acetates, nylons, polycarbonates, polyimides, and the like. Exemplary foamed materials include silicone, polyurethane, neoprene, EPR (ethylene-propylene rubber) EPDM (ethylene propylene diene monomer), PVC (polyvinyl chloride), SBR (styrene butadiene rubber), and the like. The polymers may further comprise various additives and filler known in the art, as long as such additives and/or fillers do not substantially interfere with the polymerization process.

This process is especially applicable to plastics and elastomers with unsaturation and/or polar functional groups such as carbonyl, nitrogen, and ether-oxygens, which facilitate the iodine impregnation process by formation of a polymer-iodine complex. Table 3 shows data for the preparation of conductive elastomers from polybutadiene and poly(styrene-co-ran-butadiene). The process can also be used to modify only a surface layer of a polymer as was described by M. C. DeJesus, R. A. Weiss and Y. Chen, in "The development of Conductive Composite Surfaces by a Diffusion-Controlled In Situ Polymerization of Pyrrole in Lightly Sulfonated Polystyrene Ionomers," J. Polym. Sci., Physics, Vol. 35, pp. 347–358 (1997).

In one embodiment, the polymer is impregnated with an oxidative catalyst in the vapor phase, wherein the oxidative catalyst is effective to catalyze the formation of conductive polypyrroles. This may be conveniently accomplished by exposure of the host polymer to a vaporous halogen, for example iodine vapor. Although iodine has been used previously to dope polyacetylene and polypyrrole, as described by E. T. Kang, K. G. Neoh, T. C. Tan, and Y. K. Ong, in J. Macromol. Sci. Macromol. Chem., Vol. A24, No. 6, (1987), it is used only in solutions and organic solvents. The use of iodine vapors to impregnate a polymer with an oxidant that can polymerize pyrrole has not been described. A convenient method for incorporating the vaporous oxidant into the polymer is by exposing the material to the vapor in a closed container. The impregnation temperature can be varied so as to control the equilibrium sorption of $I_2$.

In an alternative embodiment, $scCO_2$ may be used to dissolve iodine and facilitate the diffusion of the iodine into the polymer. The temperature and time of the iodine impregnation process can be varied to obtain conductive composites with conductivity from $10^{-7}$ S/cm to $10^{-1}$ S/cm, inclusive.

The catalyst-impregnated polymer is then exposed to a polypyrrole precursor, for example pyrrole, N-methylpyrrole, and mixtures thereof. Pyrrole has a relatively low oxidation potential and may be polymerized by oxidants such as iodine. Pyrrole also has a relatively high vapor pressure. The in situ vapor phase polymerization of pyrrole can be readily initiated by exposing a polymer containing oxidant to pyrrole vapor. This may also be conveniently accomplished by exposure to the vapor in a closed container. Pyrrole is oxidized by the oxidant, which results in its polymerization within the polymer host. Exposure is may be at room temperature to minimize energy costs. Alternatively, the electrical conductivity of the resultant composite may be increased by lowering the polymerization temperature (i.e., the temperature used to diffuse pyrrole into the polymer), e.g., to 0° C.

As the above description and Examples show, conductive polymers may be produced by the polymerization of conductive pyrrole. The conductivity of the composite foam can be effectively controlled between $10^{-1} \times 10^{-7}$ S/cm by varying either the amount of oxidant used, which controls the amount of conductive polymer produced, and/or the copolymer composition. The conductivity decreases as the concentration of N-methyl pyrrole in the copolymer increases. The method advantageously provides even conductivity throughout the host polymer. As the examples below show, the surface conductivities of opposite, parallel sides of the composite polymer are within an order of magnitude of each other, more preferably within 50% of each other, more preferably within 20% of each other, and even more preferably within 10% of each other.

Another particularly advantageous feature is the use of a solventless process. This provides a "green" process for synthesizing these materials, which significantly reduces the environmental impact of the processes that are currently practiced. The prior art of the preparation of conductive polymer composites relies on the use of large amounts of VOCs, which are completely eliminated by the invention described herein. The present invention also has the economic advantage that the products do not need to be dried of solvent and no byproducts need to be removed.

The invention is further illustrated by the following non-limiting examples.

EXAMPLES

Pyrrole and N-methylpyrrole obtained from Aldrich may be distilled and stored in a refrigerator. Iodine may used without any further purification. Suitable polyurethane foams with densities of 0.24 g/cm³, 0.30 g/cm³ and 0.35 g/cm³ may be obtained from Rogers Corporation, Rogers, Conn. The foam samples may be cut to a size of about 15×10×5 mm.

Conductivity measurements were made using a 4-probe method as follows. A testing fixture consisting of four parallel copper wires separated by 4 mm was pressed onto the foam samples. A constant current supplied by a Keithley 224 Programmable Current Source was applied through outer wires, and the voltage drop across inner wires was recorded with a Keithley 197 A Autoranging Mocrovolt DMM.

To illustrate the feasibility of solventless iodine impregnation, polyurethane foam was exposed to iodine vapor in a desiccator. The sorption of iodine was carried out at 21° C. for 96 hrs, followed by exposure of the $I_2$-impregnated foam to pyrrole vapor at ambient temperature (about 21° C.) for about 72 hrs. The impregnation of iodine was evidenced by a color change of the foam from white to dark brown, depending on the amount of impregnated iodine. The polymerization of the iodine-impregnated foam resulted in a color change from brown to black, which is characteristic of polypyrrole. The polypyrrole concentration can be determined by measuring the mass change of the foam before and after polymerization.

For the iodine impregnation process using $scCO_2$, an experimental setup shown in FIG. 1 was used. It consists of a high pressure, 50 cubic centimeter vessel in which the sorption of the $I_2/scCO_2$ solution into the polyurethane foam took place. The vessel containing the polyurethane sample and the $I_2$ powder was placed on a magnetic stirrer (for stirring the $I_2/scCO_2$ solution) in an oven for controlling the process temperature. An alternative way for temperature control was a water circulation system. The pressurized $CO_2$ was pumped into the vessel by a high-pressure syringe pump (ISCO, 260D), which was also used for controlling the pressure in the vessel. The process was at a temperature of 34° C. and a pressure of approximately 2000 pounds per square inch (psi) with impregnation times ranging from 24 to 72 hours. Later it was determined that the impregnation time can be shortened to 4–6 hours to obtain similar results with improved control of the impregnation process.

Results are shown in Table 1 below.

TABLE 1

| Sample No. | Impregnation method | $I_2$ uptake (%) | Polypyrrole uptake (%) | Conductivity (S/cm) Side I | Conductivity (S/cm) Side II |
|---|---|---|---|---|---|
| PU-1C | $scCO_2$ | 17.5 | 20.2 | $3.7 \times 10^{-3}$ | $4.8 \times 10^{-4}$ |
| PU-2C | $scCO_2$ | 15.4 | 11.5 | $1.3 \times 10^{-3}$ | $2.4 \times 10^{-4}$ |
| PU-1V | $I_2$ vapors | 7.8 | 10.0 | $5.1 \times 10^{-7}$ | $5.2 \times 10^{-7}$ |
| PU-2V | $I_2$ vapors | 7.6 | 8.7 | $9.4 \times 10^{-7}$ | $1.1 \times 10^{-6}$ |

As shown in Table 1, use of $scCO_2$ facilitated the sorption of $I_2$ and increased the electrical conductivity of the resultant composite foams by about 3 to 4 orders of magnitude, i.e., to $10^{-4}$–$10^{-3}$ S/cm.

The uniformity of the conductive foam was assessed by observing a uniform black color throughout the sample and by comparing the conductivity of two parallel surfaces of the foam. Table 1 shows that the conductivities of the two surfaces for the samples in which $I_2$ vapor was employed agreed to within about 10–20%, which is excellent. For the $I_2/scSCO_2$ produced samples, the differences were larger, but still within an order of magnitude, which is considered good agreement.

The reproducibility of the process was demonstrated by a series of experiments as summarized in Table 2. Iodine dissolved in $scCO_2$ was impregnated into the polyurethane foam at 40° C. and 2000 psi for 4 hours.

TABLE 2

| Sample No. | Polymerization time (hours) | $I_2$ uptake (%) | Polypyrrole uptake (%) | Conductivity (S/cm) Side I | Conductivity (S/cm) Side II |
|---|---|---|---|---|---|
| PU-4 | 48 | 14.2 | 16.5 | $5.6 \times 10^{-4}$ | $2.0 \times 10^{-4}$ |
| PU-4/A | 66 | 15.2 | 20.0 | $6.2 \times 10^{-4}$ | $4.1 \times 10^{-4}$ |
| PU-4/B | 46 | 14.4 | 18.4 | $3.5 \times 10^{-4}$ | $1.9 \times 10^{-4}$ |
| PU-4/C | 48 | 15.8 | 21.2 | $8.3 \times 10^{-4}$ | $7.7 \times 10^{-4}$ |
| PU-4/D | 24 | 15.4 | 16.5 | $4.9 \times 10^{-4}$ | $3.0 \times 10^{-4}$ |

As the results in Table 2 show, the average of five experiments gave an iodine uptake of 15.0±0.6 php (parts per hundred parts polymer), a final concentration of polypyrrole of 18.5±1.7 php and conductivity (using the 10 sides measured) of $(4.7\pm1.8)\times10^{-4}$ S/cm.

The applicability of the method to other polymers was shown by the successful formation of conductive polybutadiene composites and conductive styrene-butadiene composites, using iodine vapors at 40° C.

TABLE 3

| Polymer | Impregnation time (hours) | $I_2$ uptake (wt. %) | Polypyrrole-$I_2$ uptake (wt. %) | Conductivity (S/cm) |
|---|---|---|---|---|
| Polybutadiene | 24 | 17.5 | 20.2 | $3.7 \times 10^{-3}$ |
| Styrene-butadiene (18 wt. % styrene) | 24 | 15.4 | 11.5 | $2.4 \times 10^{-4}$ |

Figure 2:
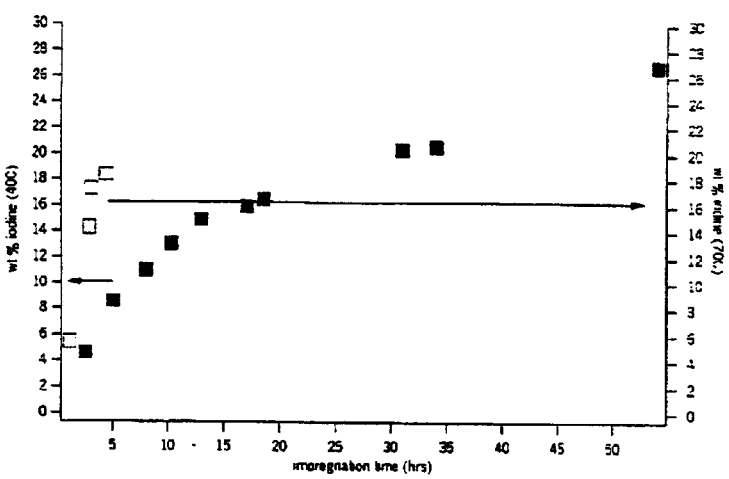
FIG. 2 is a graph comparing the amount of iodine impregnated over time at 40° C. and at 70° C.
Figure 3:
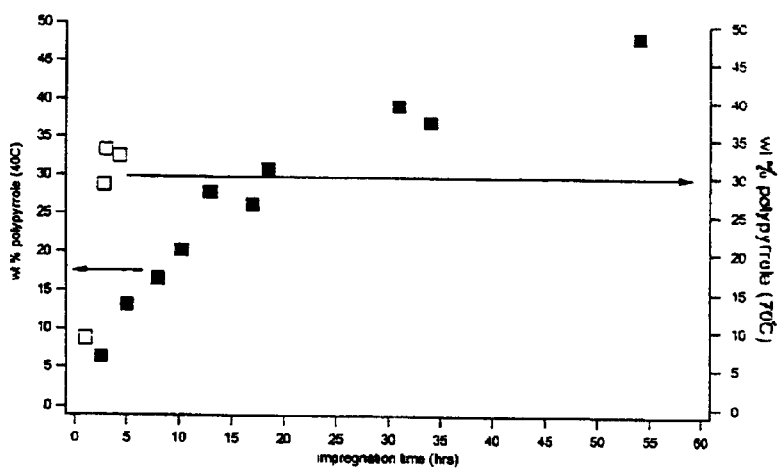
FIG. 3 is a graph comparing the amount of polypyrrole-iodine complex formed over time at 40° C. and at 70° C.
Figure 4:
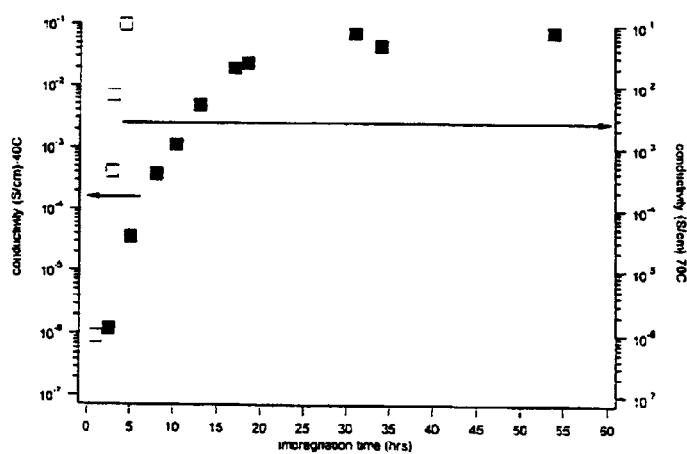
FIG. 4 is a graph comparing the conductivity of a composite over impregnation time at 40° C. and at 70° C.

FIGS. 2–4 show the effect of impregnation time on the $I_2$ sorption, the amount of polypyrrole produced, and the conductivity of the resultant foams when $I_2$ vapors were used to impregnate the foam at 40° C. and 70° C. respectively. These data demonstrate the broad range of conductivity ($10^{-6}$–$10^{-1}$) that is possible by the present process. It should also be emphasized that after polymerization of the pyrrole, no $I_2$ can be extracted from the sample either by vacuum or by solvent, i.e., any unreacted $I_2$ is complexed with the polypyrrole.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for the manufacture of a conductive polymer composite, comprising impregnating a polymer with a vaporous halogen in the absence of a volatile organic compound; and exposing the impregnated polymer to a pyrrole-containing monomer vapor to form a conductive polymer composite.

2. The method of claim 1, wherein the pyrrole-containing monomer vapor comprises pyrrole or pyrrole and N-methyl pyrrole.

3. The method of claim 1, wherein the composite has a conductivity of about $10^{-7}$ to about $10^{-1}$ S/cm, inclusive.

4. The method of claim 1, wherein the halogen is iodine.

5. The method of claim 1, wherein the polymer is a foam.

6. The method of claim 1, wherein the polymer is a polyurethane, a polybutadiene, or a styrene-butadiene copolymer.

* * * * *